Sept. 17, 1940.  E. R. EVANS  2,214,900
BRAKE MECHANISM
Filed Jan. 13, 1936  3 Sheets-Sheet 1
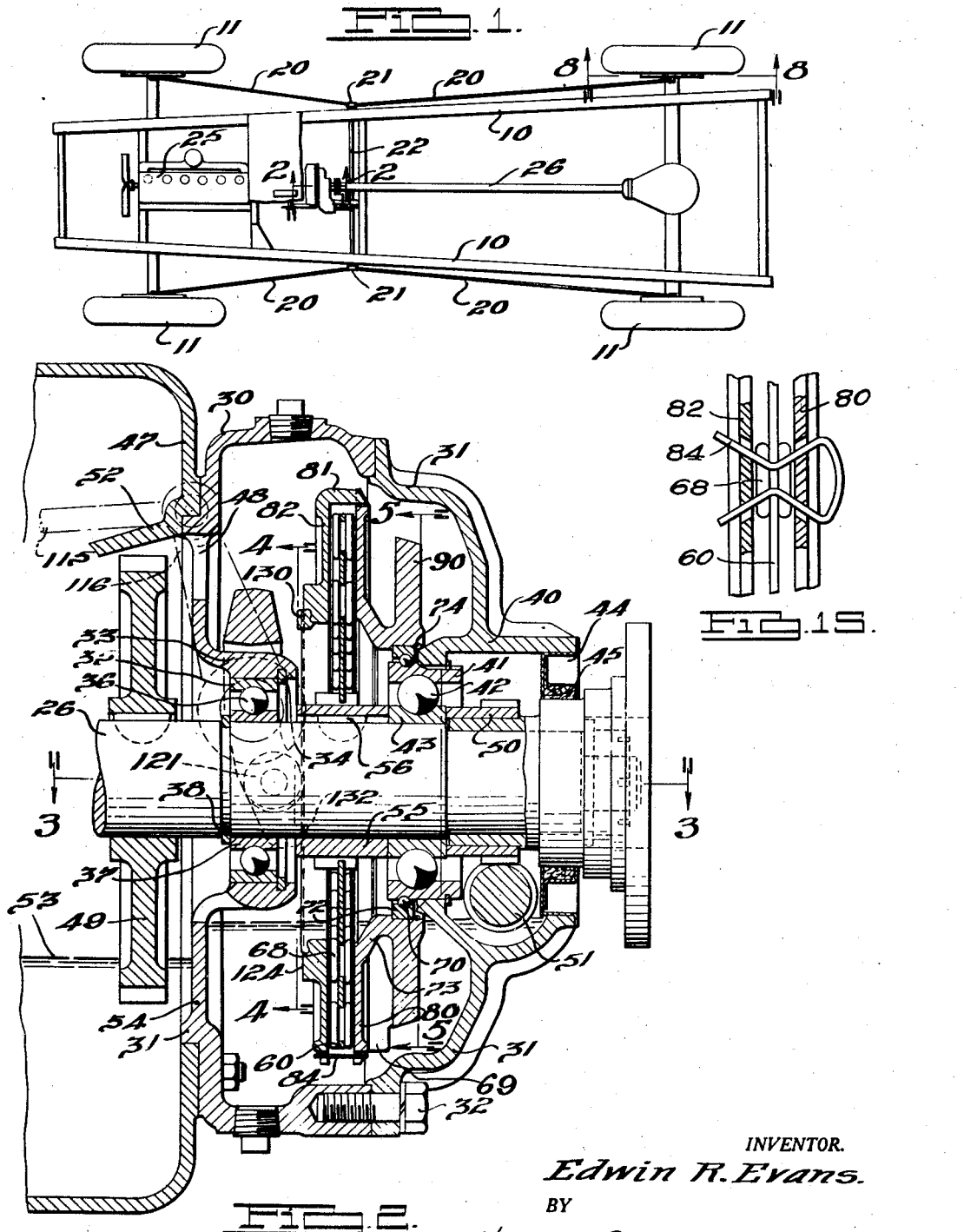
INVENTOR.
Edwin R. Evans.
BY
Harness, Dickey, Pierce & Hann.
ATTORNEYS.

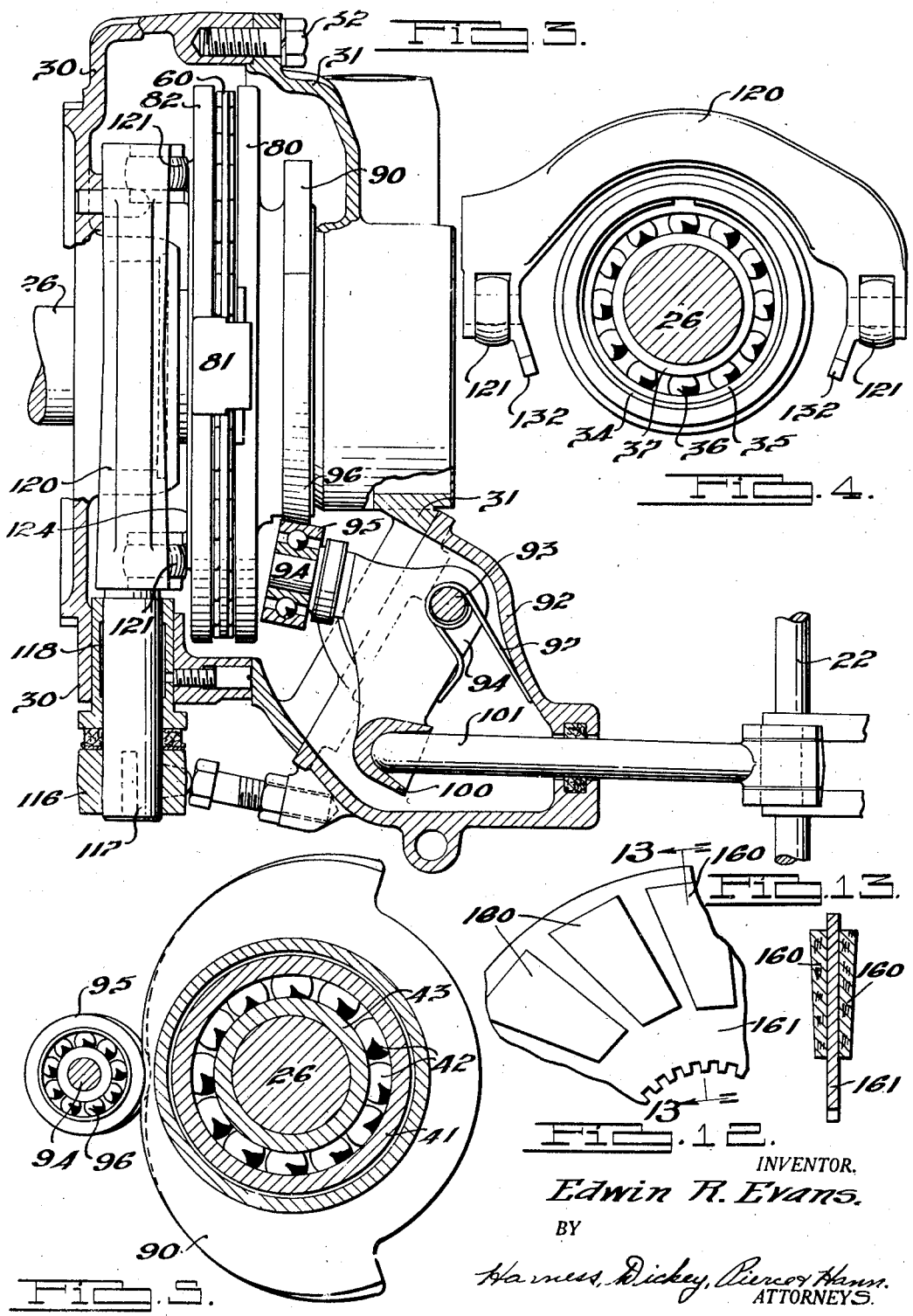

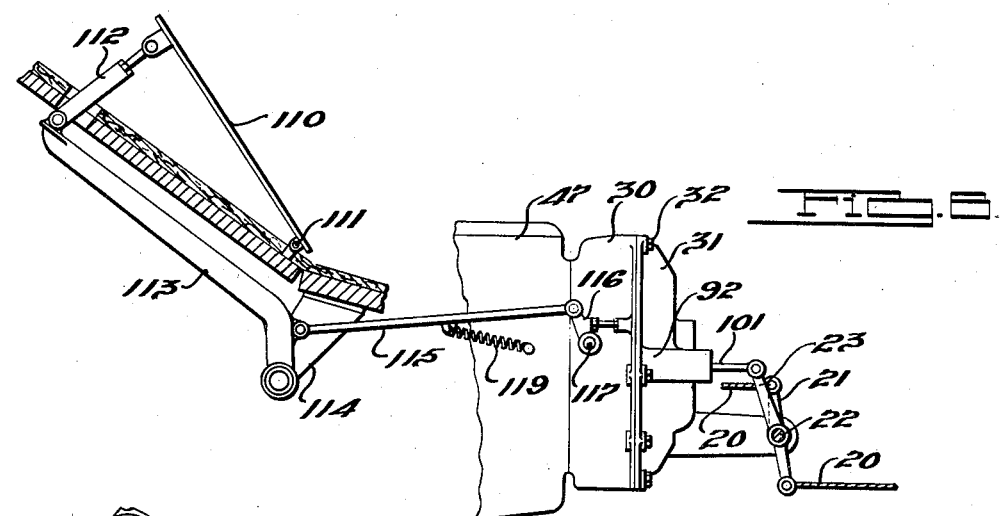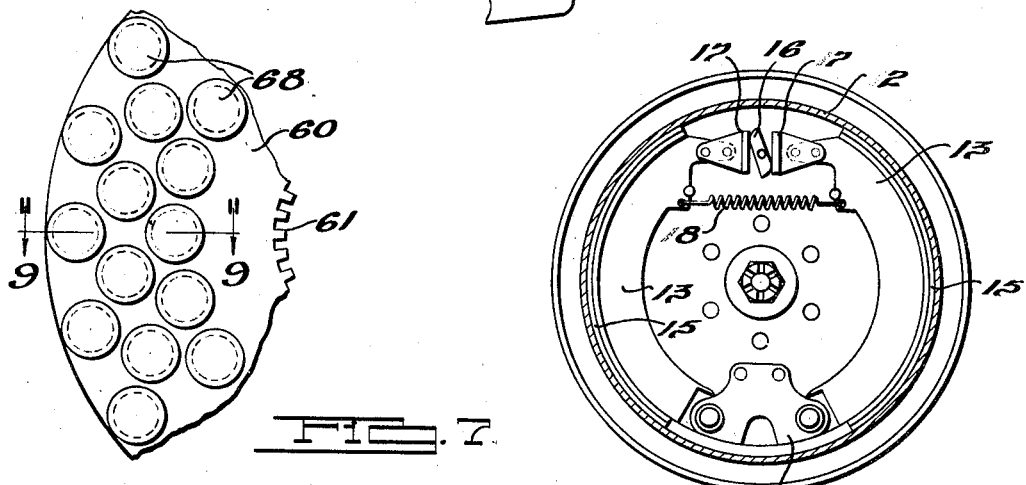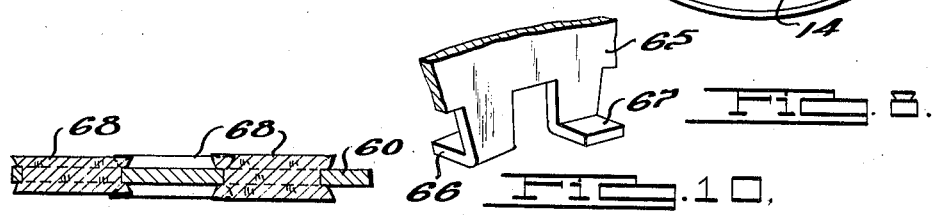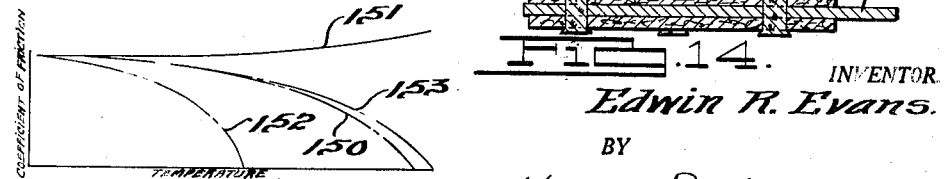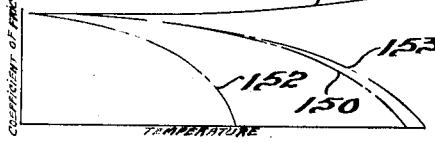

Patented Sept. 17, 1940

2,214,900

UNITED STATES PATENT OFFICE 2,214,900

BRAKE MECHANISM

Edwin R. Evans, Champaign, Ill.

Application January 13, 1936, Serial No. 58,861

6 Claims. (Cl. 188—140)

This invention relates to brake mechanisms. More particularly it relates to a servo type of brake, particularly adapted for use on automotive vehicles.

It is a primary object of the present invention to provide a brake mechanism in which the rotation of the propeller shaft or other driven element of the vehicle is utilized for the purpose of supplying the mechanical force required for actuation of the brakes, and to provide accurate and relatively simple means for controlling the application of such force.

It has long been well appreciated that in brake systems after the brakes have been frictionally engaged with the drums for an appreciable time, considerable heat is developed as a result of friction and this heat has been found to result in a marked decrease in the coefficient of friction of the brake lining. Due to this decreased coefficient of friction, it is consequently inherent that for a given actuating pressure considerably less braking effect is produced as the temperature of the inter-engaging parts is increased. This phenomenon has not been found to be particularly objectionable in conventional brake systems inasmuch as the actuating force is usually pedally provided by the operator and as the temperature of the braking element increases the actuation pressure may be controlled accordingly. In conventional servo brake systems of the general type to which this invention applies, it has been customary to utilize inter-engaging frictional surfaces generally embodying brake linings and shoes substantially the same in construction as the brake linings and shoes which are used for applying the braking force to the wheels. Consequently, in servo brake systems, a pair of inter-engaging brake mechanisms is utilized in series, both having coefficients of friction which materially decrease as the result of temperature changes. As a result of this, for a given actuating pressure applied to the servo mechanism, the resulting braking action occurring at the rear wheels will show a loss in efficiency which represents a multiplication of the loss in efficiency of the servo mechanism and the brake mechanism. Due to this multiplication it has been found that in systems of this general character the correlation between the actuation pressure and the braking effect is so distorted that the operator is in most instances unable to obtain the desired smooth and uniform braking of the vehicle. In other words, there is no definite correlation between the force supplied to the braking pedal and the braking effect applied to the vehicle wheels.

It is, therefore, a general object of the present invention to provide a servo mechanism for actuating brake systems which embodies the use of inter-engaging members in which the coefficient of friction is not materially altered as a result of temperature changes resulting from frictional engagement of the parts. The present invention contemplates the provision of a frictionally engaged servo mechanism in which the inter-engaging parts are formed of material having a substantially uniform coefficient of friction throughout all normal ranges of temperature occurring as a result of normal operation of the mechanism.

While the specific embodiment of the invention illustrated and described herein shows a servo mechanism adapted for use in mechanically operated brake systems of automotive vehicles, it will readily be apparent that the generic inventive concept presented is much broader in scope. It may readily be appreciated that the fundamental engineering principles set forth herein will find wide and practical utility in many other fields, although the construction shown has been found particularly advantageous when used in automobile braking systems.

A further object of the present invention is to provide a servo mechanism in which the inter-engaging parts are so formed that a gradual engagement is obtained and successively larger areas of frictional contact are obtained after the pedal pressure is increased. This structure makes possible a definite pedal feel transmitting to the operator a definite indication of the braking effect obtained from a predetermined pedal pressure and aiding in establishing a definite correlation between a predetermined pedal pressure and the braking effect obtained therefrom.

More specifically the present invention contemplates the provision of a frictional facing for the inter-engaging parts of the servo mechanism which comprises a plurality of isolated areas of frictional material of progressively varied height in accordance with their radial distance from the axis of rotation. Somewhat similar results have been obtained in constructions of this general type by warping one of the engaging members to provide gradual engagement of the parts and it will be readily appreciated that such a warped clutch plate may be used in combination with the novel frictional inserts described herein.

A still further object of the present invention consists in the provision of means which serve to maintain a predetermined oil level within the housing provided for the servo mechanism and at the same time provide free, yet controlled circulation of oil between the servo mechanism housing and the transmission to which it is connected.

It is a further object of the present invention to provide a servo brake system in which a definite predetermined correlation exists between the actuating pressure exerted on the pedal controlling the brakes and the actual braking force applied to the vehicle. In other words, the present invention contemplates the provision of a servo mechanism which will have a substantially uniform calibration throughout a relatively wide range of temperature and which will transmit to the vehicle brakes an actuating force substantially proportional to the actuating force applied to the servo mechanism. It may readily be appreciated that in apparatus of this general character the actuating force actually supplied to the brakes on the vehicle wheels is controlled by the frictional engagement of a rotating portion of the vehicle with suitable friction means which serves to actuate the brakes on the wheels. Consequently, when a servo mechanism is provided which creates a substantially constant ratio of actuating force to output force, substantially the same correlation between the actuating pressure on the pedal and the braking effect applied to the vehicle exists as would exist in conventional braking systems except that the actuating force has been greatly multiplied.

It is a further object of the present invention to provide a servo brake system in which particularly novel and effective means are used for translating the rotary motion of the frictionally engaged servo mechanism into a force suitable for actuating the brakes.

It is still a further object of the present invention to provide a novel means for mounting the frictional facing of the servo mechanism in order that the lubricant customarily used in mechanisms of this general character will not serve to impair the immediate and effective operation thereof. The present invention contemplates the provision of an annular disc-like member mounted in driving relation with a rotatable portion of the drive mechanism of the vehicle and provided with a plurality of frictional inserts in the face thereof immediately available upon actuation of the mechanism.

Yet another object of the present invention consists in the provision of novel and improved means for mounting the rotary frictional member of the servo mechanism on its shaft in order that it will be positively rotated thereby, but at the same time will be maintained in a plane transverse to the axis of such rotation.

Still another object of the present invention consists in the provision of a servo mechanism which is relatively simple and rugged in construction and yet exceedingly effective and positive in operation.

Many other features, advantages, and objects of the present invention will become apparent from the following specification when considered in connection with the accompanying drawings forming a part thereof.

In the drawings,

Fig. 1 is a plan view of a vehicle chassis embodying the improvements of the present invention.

Fig. 2 is an enlarged vertical sectional view taken on the line 2—2 of Fig. 1, showing the improved servo mechanism and the internal arrangement of parts thereof.

Fig. 3 is a transverse sectional view taken on the line 3—3 of Fig. 2 illustrating in detail the internal construction and arrangement of parts within the servo mechanism housing.

Fig. 4 is a sectional view taken on the line 4—4 of Fig. 2 illustrating the manner in which the servo housing is journaled on the propeller shaft and also showing the yoke for actuating the servo mechanism.

Fig. 5 is a sectional view taken on the line 5—5 of Fig. 2, showing the manner in which the brake actuating cam is journaled on the housing and the engagement of this cam with the roller mounted on the brake actuating bell crank.

Fig. 6 is a fragmentary side elevational view with parts in section showing the manner in which the improved servo mechanism is connected to the actuating pedal.

Fig. 7 is a fragmentary view of a portion of the frictional element which is mounted on the propeller shaft illustrating the manner and spacing of the mounting of the frictional element therein.

Fig. 8 is an enlarged sectional view taken on the line 8—8 of Fig. 1 illstrating one of the wheel brakes operated by the servo mechanism.

Fig. 9 is an enlarged fragmentary sectional view taken on the line 9—9 of Fig. 7, showing the manner in which the frictional insert members are retained within the friction plate.

Fig. 10 is an enlarged fragmentary perspective view of a modified means for mounting the friction disc on its shaft in order to assure the positioning of this disc in a plane transverse to the axis of the rotation of the shaft.

Fig. 11 is a chart illustrative of the variations in coefficients of friction for various members making up a servo mechanism, illustrating the resultant changes as well as the changes in coefficients of friction of the individual elements.

Fig. 12 illustrates a modified form of friction plate in which radially disposed inserts are adhesively secured to the surface thereof.

Fig. 13 is a sectional view taken on the line 13—13 of Fig. 12 showing the manner in which the modified form of frictional members are secured to the friction plate.

Fig. 14 is a sectional view showing a modified form of frictional surface for the friction plate in which the insert members of the present invention are combined with a structure having a conventional clutch facing.

Fig. 15 is a fragmentary elevational view showing the manner in which the friction members are resiliently urged away from each other.

With more particular reference to the drawings, it will be appreciated that the specific embodiment of the invention illustrated therein and described below is merely illustrative of a specific installation embodying the features of the present invention. It will be appreciated that the present showing has in many respects been simplified in order to more clearly illustrate the inventive concept disclosed, and consequently many and various modifications, substitutions, and alterations, falling within the scope of the invention, will be apparent to those skilled in the art.

By way of illustration as shown in Fig. 1, is shown, a conventional automobile chassis, comprising a pair of longitudinally extending frame members 10 which serve, by means of conventional springs (not shown), and supported by wheels 11. Each of the wheels 11, as is conventional in the art, is provided with a brake drum 12 which coacts with a suitable pair of brake shoes 13, as is shown in Fig. 8. The specific construction of this wheel brake mechanism forms no part of the present invention and it will readily be apparent that any suitable conventional brake mechanism may be used in connection therewith.

In the particular specific construction shown, the brake shoes 13 are each pivotally mounted on a suitable fixed support or anchor 14 and carry on their peripheral surfaces brake lining elements 15, which are adapted to engage the inner surface of the brake drum 12. While suitable hydraulic operated means or other conventional actuating mechanism may be utilized for expanding the brake shoes 13 into engagement with the drum, by way of illustration the drawings show a mechanically operated type of brake in which a cam 16 pivotally mounted in the brake housing serves to engage suitable cam faces 17 formed on each of the shoes 13. As is conventional in the art, a suitable tension spring 18 serves to retract the shoes out of engagement with the brake drum 12 at such times as may be desired.

Brakes such as are shown in detail in Fig. 8 are, as is conventional in the art, mounted on each of the individual wheels of the vehicle and the cam members 16 thereof are operated by means of suitable brake rods 20 connected by means of levers 21 to a transversely disposed actuating shaft 22, mounted for rotation in the longitudinal central portion of the chassis. This actuating shaft 22 is rotated by means of a crank arm 23 secured thereto, which is connected to and operated by the servo mechanism of the present invention hereinafter described in detail.

As is conventional in the art, an internal combustion engine 25 is mounted in the frame members 10 and has formed therewith at the rear thereof a suitable transmission mechanism, from which extends a rearwardly projecting propeller shaft 26 which, by means of suitable universal joints and differential mechanism, serves to drive the rear wheels 11. The improved servo mechanism hereinafter described is preferably mounted around the propeller shaft 26 immediately in the rear of the transmission and preferably between the transmission and the first universal joint of the propeller shaft.

This improved mechanism preferably comprises a housing which is mounted in stationary position with respect to the rotary propeller shaft 26. This housing preferably comprises a pair of mating castings 30 and 31 which extend annularly around the propeller shaft 26 and are journaled thereon as hereinafter described. These castings are preferably provided with mating portions and may be secured together by means of an annular series of cap screws 32. The housing member 30 is provided in its hub portion with an inwardly projecting annular flange 33 and has in the inner edge of this flange a groove in which is mounted a suitable split ring 34 which serves to axially position an annular raceway 35. This raceway 35 is preferably grooved in its inner face and surrounds an annular series of ball bearings 36 which cooperate with an inner raceway 37 locked in axial position on the shaft 26 by means of a suitable split ring 38 seated in a suitable groove in the shaft 26.

The casting 31 is likewise provided in its hub portion with an axially extending annular flange 40 which at its inner end is secured to an annular raceway 41 cooperating with an annular series of balls 42 seated in an inner raceway 43 mounted on the shaft 26. Mounted within the outer axial end of the flange 40 is an annular sheet metal collar 44 which serves to house a mass of packing material 45 which is adapted to engage the peripheral portion of the shaft 26 in order to effect a fluid tight joint and prevent the leakage of lubricant from the interior of the housing.

The housing 30 serving to enclose the servo mechanism is provided with a portion which mates with the rear wall of a conventional transmission housing 47. A suitable aperture 48 is provided above the shaft 26 and providing communication between these housings. Within the transmission housing 47 keyed to the shaft 26 is a gear or other suitable rotary element 49 which may be a portion of the over-direct drive mechanism of the housing, or any other suitable element rotatable with the shaft 26. A baffle plate 52 slopes downwardly into the transmission housing from the upper marginal edge of the aperture 48. As is conventional in structures of this general character the transmission housing contains a supply of lubricant 53 which as is conventional in the art is maintained at a suitable level therein. It will be appreciated that as shaft 26 and associated gear or rotary element 49 are rotated this rotary element 49 will pick up oil from the transmission housing and this oil will be thrown by centrifugal force against the baffle plate 52 and thence through the aperture 48 into the servo mechanism housing. A suitable wall 54 serves to prevent communication between the lower portion of the servo mechanism housing and the lower portion of the transmission housing until the oil in the servo mechanism housing has attained a predetermined level. It will be appreciated from the foregoing that by regulating the height of the baffle plate 52 the level of oil within the servo mechanism housing may be maintained at the desired predetermined height independent of the level of oil in the transmission housing. This feature has been found to be particularly important inasmuch as the calibration of the servo mechanism hereinafter described is very critical and its accurate control is in some considerable measure dependent upon the exact manner in which it is lubricated.

As is conventional in constructions of this kind, the shaft 26 is provided with a worm wheel 50 thereon, which meshes with a worm 51 serving to drive the conventional speedometer cable, which apparatus however forms no part of the present invention, except as a method of lubrication.

Substantially in the axially central portion of the housing composed of the castings 30 and 31 is a collar 55 keyed to the shaft 26 by means of a suitable conventional key 56. The peripheral portion of the collar 55 is preformed to provide around the surface thereof, a series of axially extending spline-ways. A disc-like friction member 60, shown in detail in Fig. 7, has a central aperture therein, the marginal edges of which are formed to provide a circular series of teeth 61 adapted to enter the spline-ways formed in the collar 55 and consequently insure that the disc 60 will be positively rotated with the shaft 26. It will be appreciated that this construction serves to mount the disc 60 in a plane transverse to the axis of the rotation of the shaft 26 although the disc 60 is permitted to move axially along the shaft within a certain limited longitudinal area. Axial movement of the disc with respect to this shaft will be limited by means of the frictional elements hereinafter described.

In Fig. 10 is illustrated a modification of the friction disc having a uniquely and extremely satisfactory construction for mounting the same upon the splined collar 55. In this form of the invention the metal disc has downwardly projecting tabs of a length considerably greater than is necessary to enter the spline-ways. Preferably alternate tabs or lugs are bent axially in opposite directions consequently providing a circumferential series of lugs 66 extending axially along the shaft 26 on one side of the disc and a similar series of circumferentially spaced lugs extending axially along the shaft 26 on the opposite side of the disc. It will be seen that these lugs lie in the bases of the channels between the splines on the collar and serve to not only provide a relatively large surface of engagement between the collar and the disc, but also insure that the position of the disc is maintained in a plane transverse to the axis of rotation of the shaft 26.

While any suitable frictional material may be used to provide a frictional surface on the disc 60, which will have the properties and coefficients of friction throughout a heat range satisfactory for the purposes of the present invention, it has been found preferable to use a plurality of cork inserts 68. While these inserts 68 may be mounted on the disc in any suitable way, it is preferable to provide the disc 60 with a plurality of annular series of apertures, in which are inserted the inserts 68. The inserts 68 are preferably substantially cylindrical prior to insertion and are deformed by their insertion into the apertures in the disc sufficiently so that they will be frictionally retained in position and extend slightly axially on either side of the disc. While, as described above, the frictional inserts may be formed of any suitable material, it is preferable to use cork or cork composition because it has been found that the coefficient of friction of cork when used in constructions of this general type tends to remain substantially constant throughout a relatively wide temperature range. This particular feature has great significance in connection with the present invention as will hereinafter be more clearly seen.

Cork, being resilient inherently and maintaining this resiliency by not packing down under heat, lends itself well to using stepped contact surfaces, as will hereinafter be more fully described, and also a softness of feel which is a desirable feature.

A feature of considerable importance in the present invention is clearly seen in Fig. 9 which shows a sectional view of the cork inserts 68 mounted in the disc 60. It will be noted by reference to this figure that in the specific embodiment of the invention illustrated in Figs. 7 and 9, the cork inserts are disposed in three concentric circular series. It will be noted that after these cork frictional inserts 68 have been mounted in the friction disc, their surfaces are ground to provide a flat finish thereto and remove any bulging thereof which might inherently result from their insertion. Further it will be noted that the outermost annular series of inserts is of slightly less height than the central series and that the innermost series of inserts is of still greater height from the face of the friction disc 60. Consequently it will be apparent that the frictional faces of these inserts are of progressively decreasing height as their distance from the axes of rotation is increased. The importance of this structure will be more clearly apparent hereinafter.

Inasmuch as the housing in which this friction disc is mounted contains considerable lubricant of the type commonly used in transmissions, it is inherent that during the operation of the apparatus the disc and the frictional inserts thereon will become covered with lubricant and it is desirable to space these inserts slightly and to provide a construction in which the individual inserts themselves have a relatively small surface area in order that as the parts become frictionally engaged, as will hereinafter be seen, the plates which these inserts engage will serve to remove the oil from the surface of the inserts and likewise from the surface of the plates in order that a clean more uniform frictional engagement will be obtained.

In the past, devices of the general type with which the present application is concerned, encountered great difficulty because it is essential that relatively heavy lubricating oils must be used in the transmission and in any oil under the best conditions the so-called "cold drag" is caused by the oil "freezing" in cold weather. In devices heretofore known, this cold drag due to the design of the mechanisms heretofore used, will cause a sufficient drag to apply the wheel brakes sufficiently to actually make the car inoperative by braking either or both the front and rear wheels so that the motor cannot turn them, or locking the front wheels so that the reduced contact friction with the road is not sufficient to allow them to turn and consequently materially impairing the steering of the car. The only way at present known to overcome this condition is to allow the engine to idle and churn the oil in the transmission until it becomes properly heated, or to "jump" the clutch into engagement until the mechanism breaks loose.

In the devices heretofore known, referred to above, the arrangement of parts serves to exaggerate this effect. Preferably, in accordance with a further phase of the present invention, at least one of the driven members is provided with one or more projections thereon adapted to be imbedded in the lubricant in the casing, so that when the lubricant is "frozen" a sufficient anchoring of the driven members in the "frozen" lubricant will occur to effectively overcome any frictional drag which may simultaneously exist between the driving and driven members under such conditions and during non-operative periods. To insure this function of the device in this respect, in the particular construction shown in the drawings and as best shown in Fig. 2, a radially directed web 69 is formed between the plate 80 and cam 90, which web 69 extends downwardly so as to be projected to a maximum extent in lubricant in the casing 31. In the design shown by the present invention, particularly in Fig. 2, although it will be apparent that the more the oil freezes, the greater will be the pedal pressure necessary to apply the brakes, it will be clear that the oil will be quickly heated upon operation of the vehicle so that there is no appreciable delay in reaching normal functioning.

An annular raceway is formed on the outside surface of the raceway element 41 and serves to provide a channel for an annular series of ball bearings 70 which are surrounded by a raceway element 72 which is in turn mounted in a position in a casting 73 by means of a suitable split ring 74 seated in an inwardly presented channel therein. The casting 73 has a radially extending portion 80 which has a plain annular axial face adapted to engage the frictional inserts 68 in the disc 60. At suitable circumferentially spaced points around its outer periphery, this frictional member 80 is provided with recesses adapted to receive axially extending lugs 81 formed on the peripheral surface of an annular frictional member 82 adapted to engage the inserts 68 on the opposite side of the disc 60. The lugs 81 on the friction member 82, cooperating with the recesses at the peripheral edge of the friction member 80, serve to prevent relative rotational movement between these two members. A plurality of circumferentially spaced spring members 84 are adapted to engage the members 80 and 82 and serve to normally urge these members axially away from each other to maintain them released from frictional engagement with the insert members 68 in the disc 60.

Preferably formed integrally with the casting 73 is a cam member 90, clearly seen in Fig. 5. This cam member is preferably symmetrical in configuration in order that it will produce the same effective results irrespective of the direction in which it is rotated. Suitable means are provided for mounting an operating shaft with respect to the servo mechanism and by way of illustration the drawings disclose an auxiliary housing 92 which is suitably secured to an aperture in the housing 31 and has a transversely disposed shaft 93 mounted therein. A bell crank arm 94 is pivotally mounted on the shaft 93 and carries on one of its arms a roller 95 rotatably mounted thereon by means of suitable ball bearings 96. This roller 95 is adapted to engage the peripheral surface of the cam member 90 and is urged into engagement therewith by means of a spring element 97 which has a plurality of convolutions surrounding the shaft 93 and one end engaging an arm of the bell crank 94 and the other end engaging the casing 92. The other arm of the bell crank 94 is provided with a cup shaped portion 100 which is adapted to receive the forward end of a longitudinally reciprocable operating rod 101, which has its opposite end secured to the crank arm 23 described above. It will be appreciated that when the friction members 80 and 82 are urged into engagement with the disc 60 they will tend to be rotatably moved thereby causing a consequent rotation of the cam member 90, resulting in a pivotal movement of the bell crank 94 about its pivot and a consequent longitudinal movement of the actuating rod 101 which will serve by means of the linkage described above to simultaneously actuate all of the brakes at the various wheels of the vehicle.

From the foregoing, it will be clearly apparent that engagement of the members 80 and 82 with the plate 60 results from axial movement of the member 82 into contact with the plate 60 and subsequent movement of the two elements 82 and 60 into contact with the member 80 which is so mounted that axial movement thereof is precluded.

As is particularly clearly shown in Fig. 5 the peripheral surface of the cam member 90 is formed of a configuration such that it will provide a maximum contact with the cylindrical surface of the inter-engaging roller 95 irrespective of the relative positions of these two members. It will be appreciated that due to the fact that the roller 95 is journalled on one arm of the bell crank 94 that as the cam member 90 rotates the axis of rotation of the roller 95 will be shifted through a considerable angular degree. Consequently the peripheral surface of the cam 90 is preformed to provide a structure which will engage the roller uniformly at all times.

Means are provided interiorly of the body of the vehicle for actuating the servo mechanism and may comprise a pedal 110 pivoted at its base 111 and having adjacent its upper end a pivotal connecting link 112 which is preferably constructed so that its effective length may be varied to effect adjustment of the pedal. This link serves to interconnect the pedal 110 with a crank arm 113 which is pivotally mounted on a suitable bracket 114 secured to the lower side of the body floor. At a point, a suitable radial distance from the axis of the pivot on which the crank arm 113 is mounted, an operating link 115 serves to interconnect this crank arm with a lever 116 pivotally mounted on the housing 30. This link 115 has its rear end pivotally connected to a crank 116 permanently secured to a shaft 117 journalled for rotation in a suitable bearing 118 in the housing 30. Packing may be disposed around this shaft 30 at the point where it enters the housing 30 in order to effect a lubricant tight joint at this point. A tension coil spring 119, anchored to some stationary point, such for example on the transmission housing, has its other end secured to the operating link 115 to maintain the actuating mechanism normally in disengaged position, as will hereinafter be clearly seen. The peripheral surfaces of the cam member 90 and cooperating roller 95 are preferably formed of chilled cast iron or otherwise suitably hardened in order that they will be highly wear resistant and maintain accurately their configuration even though subjected to considerable hard wear.

A portion of this shaft 117 interiorly of the housing is preferably preformed to provide a yoke 120, which extends around the hub portion 33 of the housing 30 and which has journaled therein a pair of rollers 121 which are preferably mounted for rotation on a common axis, which axis lies in the same plane as the axis of rotation of the shaft 26 but is transverse thereto. These rollers 121 are adapted to engage an annular trackway 124 formed on the axial outer face of the friction member 82. It will be seen that depressing the pedal 110 serves, by means of the interconnecting links and crank arms, to cause a rotational movement of the shaft 117 and consequently a movement of the yoke 120, such that the rollers 121 will be moved axially with respect to the shaft 26. Such movement of the yoke will cause the rollers 121 to engage the trackway 124 and to urge the friction members 82 and 80 into engagement with the opposite sides of the friction plate 60, which, as has been explained above, is splined on a suitable collar keyed to the shaft 26.

An axially projecting stop lug 130 is preferably formed integrally with the friction plate 82 and serves to cooperate with a pair of hooklike stop members 132, preferably formed integrally with the yoke 120. These hooklike stop members 132 project into the circumferential path of movement of the stop member 130 and consequently limit rotation of the friction plates 80 and 82 to a predetermined maximum. The hooklike members 132, which serve to control and limit rotational movement of the friction plates, are preferably spaced an angular distance apart sufficient to prevent the cam member 90 from turning through a greater degree of angular movement than is desired, thus consequently always maintaining the cam face of this member in engagement with its cooperating roller 95.

The springs 18 which serve to keep the brake shoes disengaged from their respective brake drums as well as the spring 97, shown in the form of the invention illustrated in Fig. 3 of the drawings, cause the roller 95 to be urged against the surface of the cam 90. Consequently, when the members 80 and 82 are released from engagement with the friction disc, the pressure on this roller will inherently cause these members to rotate until the roller lies in substantially the position illustrated in Fig. 5 of the drawings.

An interesting feature of the present invention, which may be understood from the construction described above, is that the limit stop members on the cam set up a definite predetermined limit to the stopping impulse applied by the foot pedal and consequently when this limit is reached, a definite impulse will be transmitted to the foot pedal warning the operator that this limit has been reached. It will be clear, however, that this limit will not be reached during normal operation of the mechanism when the parts are in proper adjustment and consequently, when such impulse is transmitted to the operator, it will constitute a warning that the device is in need of adjustment. It will be readily appreciated that this warning makes itself apparent before the actual braking efficiency of the mechanism is materially reduced.

The operation of this apparatus is substantially as follows:

We may assume that the vehicle is progressing in a forwardly direction and if such be the case it is inherently essential that the propeller shaft 26 will be rotating at a speed proportional to the rate of movement of the vehicle. When it is desired to stop the car, the foot pedal 110 is depressed, which operates through the linkage 112, 115, and crank 116 to cause a rotational movement of the shaft 117. As has been explained above, rotational movement of the shaft 117 will cause the yoke to swing about the axis of the shaft 117 and consequently move the rollers into engagement with the trackway 124 formed on the frictional element 82. This engagement of these rollers with this cam trackway will serve to move the frictional elements 80 and 82 relatively toward each other and cause the frictional faces thereof to engage the insert members in the disc 60. As has been described above, these insert members in the disc 60 projecting from either side thereof consequently will frictionally engage the axial faces of both of the frictional members 80 and 82.

It will be appreciated that the frictional faces of the friction members 80 and 81 lie in substantial radial planes and consequently, as these members are moved axially toward the friction disc 60, they will frictionally engage first the inner annular series of inserts mounted in the face thereof. As has been explained above, these inserts are of progressively decreasing height and consequently the highest or radially inward annular series will be engaged first. It will be appreciated that, as the pedal pressure is increased, this annular series of insert members will be compressed to an extent sufficient to effect engagement of the central or next adjacent radially outward series of inserts and when these insert members have been compressed, final engagement of the extreme outer series of inserts will take place. It will be appreciated that due to the varying height of the respective series of inserts above the axial face of the friction disc in which they are mounted, they serve to provide a progressively increasing area of frictional contact between the insert members and the frictional members which they engage as the pedal pressure is increased. It will be appreciated that this construction will inherently afford accurate control of the frictional engagement of these members and will consequently materially increase the sensitivity of the servo mechanism as a whole and transmit to the operator a definite sensation indicating the extent to which the brakes are being applied by the servo mechanism.

Due to the spacing and relatively small individual area of the inserts their contact with the frictional faces of the members 80 and 82 will serve to scrape the oil therefrom and almost immediately provide a relatively dry frictional contact. It will be seen that due to the axial movement along the propeller shaft of the disc 60 that both sides of this disc will be uniformly engaged by the frictional members 80 and 82. Due to this frictional engagement, the members 80 and 82 will tend to rotate with the disc 60 and consequently effect a partial rotation of the cam member 90.

If it be found in the manufacture of servo brake mechanisms of the type disclosed herein that one side of the friction disc is subjected to unreasonably more wear than the other, it will be apparent that the construction disclosed herein may be very easily modified to provide a construction in which the wear is substantially equal on both sides of these members. This result may be accomplished by increasing the height of the frictional inserts on one side of the disc or by varying the flow of lubricant to increase the lubrication on the side of the disc receiving the greater wear in order to compensate these parts.

Due to the cooperation of the roller 95 with the cam surface of the cam 90, partial rotational movement of the cam will cause a pivotal movement of the bell crank 94 about its axis 93. As has been explained above, this pivotal movement of the bell crank 94 serves by means of the operating rod 101 and actuating shaft 22 to operate all four of the wheel brakes simultaneously. After the wheel brakes have been applied for an appreciable length of time, considerable heat will be developed due to the frictional engagement thereof and likewise considerable heat will be developed due to the inter-engaging portions of the frictionally engaged servo mechanism. As has been explained above, the insert members in the servo mechanism are of such composition that the heat thus developed does not tend to materially alter the coefficient of friction of this engagement. In the brakes, however, it has been found that the coefficient of friction falls off relatively rapidly as the temperature of the interengaging parts is increased, and it will therefore consequently be necessary to apply additional foot pressure to the pedal 110 in order to obtain equally effective braking at this increased temperature. However, due to the relatively constant coefficient of friction of the servo mechanism, it will be readily appreciated that this additional pressure required will proportionally be no more than the additional pressure required in cases of brakes operated by a normal system of linkage or hydraulic mechanism due entirely to the substantially constant coefficient of friction of the servo mechanism.

In Fig. 11 is illustrated a chart on which curves have been plotted to illustrate the braking effect obtained for a constant pedal pressure and the manner in which this braking effect is altered by increases in temperature. The curve 150 illustrates the falling off or fading out of the coefficients of friction due to increased temperature in conventional wheel brake sysems employing no servo or auxiliary actuating mechanism. The curve 151 illustrates the optimum or maximum efficiency of a servo mechanism in which interengaging parts having cork faces are used and in which the other features mentioned above serving to control the coefficient of friction between the interengaging parts, have been adjusted to maximum efficiency. It will be appreciated by reference to this curve that the braking effect not only does not decrease as the result of a rising temperature, but actually increases as the temperature is increased. The curve 152 illustrates the acute loss in braking effect in servo brake systems where the inter-engaging parts of the brake and servo mechanism both utilize conventional brake linings for the surfaces of the inter-engaging parts. From this curve it may be graphically seen that a very great loss is obtained in braking systems of this type as a result of increases in temperature. It will be appreciated from this curve that the falling off of braking effect commences almost immediately upon application of the brakes and renders the braking system relatively ineffectual at even low normal operating pressures.

The curve 153 clearly shows the result of braking effect obtained in a servo brake system in which the interengaging parts of the servo mechanism are formed of cork or material having similar characteristics and in which the lubricant control and adjustment of the inter-engaging surfaces is accurately controlled, such as is the case in the apparatus described herein. From this curve, it is readily apparent that throughout the normal range of operating temperature, even slightly greater braking effect is obtained for a given pedal pressure than is obtained in conventional mechanically operated brakes.

The servo mechanism above described differs fundamentally from a conventional clutch construction in that throughout the entire operation of the apparatus it will be appreciated that there is a constant slipping between the inter-engaging parts. This is, of course, not true with a conventional clutch construction and the factors determining the control and operation of this servo mechanism are therefore quite distinct in both principle and operation from a clutch construction.

The apertures in the disc in which the inserts are mounted are illustrated in the drawings as being substantially circular. It will be appreciated, however, that oblong holes or holes of any other configuration may be utilized to receive the inserts and similarly the outer configuration of the inserts may be varied as may be desired to obtain the best results depending upon the type of lubricant and the manner in which the lubricant is circulated.

A modified form of friction plate is shown in Figs. 12 and 13 of the drawings in which a single annular series of relatively long, narrow inserts 160 is adhesively secured or bonded to the axial faces of a friction plate 161 which is substantially the same in construction as the friction plate 60 except that the apertures for applying the frictional inserts are not necessary. The frictional inserts 160 may be formed of any suitable material having a coefficient of friction and other properties satisfactory for the purpose of the present invention as described above. While any suitable binder or adhesive material may be utilized for the purpose of adhesively securing these frictional inserts to the axial faces of the friction plate 161, it has been found extremely satisfactory to utilize a Bakelite composition or suitable phenolic condensation product.

It will be noted that the radially disposed friction members 160 are slightly thickened at their outer ends and of progressvely decreasing thickness inwardly toward the axis of rotation until a point of minimum thickness is attained at their radially inward ends. It will be appreciated that when a friction disc having inserts of this type is utilized in connection with the friction members 80 and 82 described above, the frictional inserts will be engaged first at their outer ends and as the pedal pressure is increased, a progressively increasing area of frictional contact will be obtained between the inserts and the frictional members which they engage. It will be appreciated that this construction is the converse of the construction described in connection with the friction disc 60 and frictional inserts 68 in which the surface area engaged first was at the radial inward portion of the area in which the inserts are disposed. From the foregoing it will be appreciated that either the outer portions of this area in which the frictional inserts are disposed may contain the thicker inserts or portions thereof or else the thicker portions may be disposed in the radially inward area. It is, however, quite important for obtaining smooth, accurate operation of a servo mechanism of this type that the area of frictional engagement contain inserts of progressively varying height in order that an increased pedal pressure will result in a progressively increased area of contact between the insert members and the frictional members which they engage.

One objection to power braking mechanisms heretofore known is the over-braking effect resulting in a slapping in of the brakes and severe wind up of the car springs resulting in the uncomfortable pitch of the vehicle. By bringing into engagement frictional material of relatively short radius from the axis of rotation, the brakes will be applied gradually and, as increased pressure is applied to the pedal, a materially greater area radially outward from the area of the frictional material making contact will be brought into frictional engagement and consequently a smooth, gradual braking action will be obtained. On large vehicles, such for example as trucks and the like, it is found that in some instances it is desirable to use the greatest radius, that is, having the insert members highest at a point of maximum radius from the axis of rotation in order that a substantial braking action and effective area of engagement will become immediately available upon application of pedal pressure. In any event, it has been found particularly desirable to utilize frictional members of varying heights in order that the surface area engaged will be in some substantial extent proportional to the pedal pressure.

A still further modified construction of friction disc is illustrated in the sectional view in Fig. 14. In this form of the invention a friction disc 165 is provided having a configuration substantially the same as the friction discs 60 and 161. This friction disc is provided with conventional annular clutch facings throughout the area in which it is adapted to engage the friction members 80 and 82. This clutch facing or frictional surface may be of any suitable fabric or moulded material such as is well known and conventional in the art. Suitable annular series of apertures are provided through both the disc and the clutch facing in which are mounted frictional inserts 167 of cork or any other suitable material having the desired frictional properties. As is clearly seen by reference to Fig. 14, these frictional insert members extend above the surface of the clutch facing 166 and consequently they will be engaged frictionally by means of the friction members 80 and 82 prior to final engagement thereof with the clutch facing material.

It will be appreciated that in all servo brake systems considerably less actual mechanical force is required on the breaking pedal in order to produce a predetermined braking effect than in conventional linkage or hydraulic systems. Consequently, in the preparation of the chart shown in Fig. 11, pedal pressures were arbitarily selected in which a predetermined braking effect was obtained at the normal initial temperature of the parts.

It will be appreciated from the foregoing that the specific embodiment of the invention illustrated in the drawings and described above is merely illustrative of one form of the generic inventive concept defined in the subjoined claims. Many other and further modifications will be apparent to those skilled in the art.

I claim as my invention:

1. In a brake system, servo mechanism comprising a rotatable member, a frictional member adapted for engagement therewith, an element for urging said members into engagement, a cam member adapted for partial rotation as a result of such engagement, and means on said element adapted to cooperate with means on said one of said frictional members for limiting rotational movement of said cam member.

2. In a servo mechanism for operating the wheel brakes of a motor vehicle, a lubricant containing casing, a driving shaft therein, a disc secured for equal rotation with said shaft, rotatable plate members on opposite sides of said disc, a cam fixed for rotation with one of said plate members, means for urging said plate members into frictional engagement with said disc whereby to cause rotation of said cam, and means actuated by movement of said cam for actuating said wheel brakes, at least one of said plates having a projection thereon for preventing the drag, set up between it and said disc when the lubricant in said casing is frozen, from actuating said cam.

3. In a servo brake system, a rotatable shaft, a friction disc mounted on said shaft for rotation therewith, a pair of friction members adapted to engage opposite sides of said disc and mounted for limited rotational movement therewith, an abutment rigidly formed with respect to one of said members, a pivotally mounted operating arm, rollers carried by said arm adapted to engage one of said members to move the same into engagement with said disc, and means carried by said operating arm adapted to engage said abutment to positively limit rotational movement of said members.

4. In a servo mechanism, a rotatable shaft, a friction disc mounted on said shaft for rotation therewith, friction members adapted for engagement with said disc and adapted to be partially rotated thereby, a lever for urging said friction members into engagement with said disc, means projecting from one of said members and a stop member on said lever adapted to engage said projecting means whereby to limit the rotational movement of said friction members.

5. In a servo brake system, a rotatable shaft, a friction disc mounted on said shaft for rotation therewith, a pair of friction members adapted to engage opposite sides of said disc and mounted for limited rotational movement with said disc, said friction members being interconnected to preclude relative rotational movements of one with respect to the other, an operating member for urging said friction members into engagement with opposite sides of said disc, a stop member projecting from one of said friction members, and means on said operating member adapted to engage said stop member whereby to limit rotational movement of said friction members within a predetermined range.

6. In a servo mechanism, a rotatable shaft, a friction member mounted on said shaft for rotation therewith, a second friction member adapted for engagement with said first friction member, adapted to be partially rotated thereby, means for urging said members into engagement, a stop member on said last mentioned means, and means on said second friction member adapted to engage said stop whereby to limit rotational movement of said second friction member.

EDWIN R. EVANS.